United States Patent
Ito

(10) Patent No.: US 7,061,218 B2
(45) Date of Patent: Jun. 13, 2006

(54) CONTROL CIRCUIT OF DC—DC CONVERTER AND CONTROL METHOD THEREOF

(75) Inventor: Hidenobu Ito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/025,134

(22) Filed: Dec. 30, 2004

(65) Prior Publication Data
US 2006/0071651 A1    Apr. 6, 2006

(30) Foreign Application Priority Data
Sep. 30, 2004    (JP)    ............................ 2004-288533

(51) Int. Cl.
H02M 3/156    (2006.01)
(52) U.S. Cl. ........................ 323/351; 323/224; 323/284
(58) Field of Classification Search ........ 323/222–225, 323/268, 271, 282–285, 351
See application file for complete search history.

(56) References Cited

U.S. PATENT DOCUMENTS 6,151,233 A * 11/2000 Kondo ........................ 363/125
6,541,947 B1 * 4/2003 Dittmer et al. ............. 323/284
6,870,354 B1 * 3/2005 Nishimaki .................. 323/284

FOREIGN PATENT DOCUMENTS

JP    09-154275    6/1997
JP    2004-056992    2/2004

* cited by examiner

Primary Examiner—Gary L Laxton
(74) Attorney, Agent, or Firm—Arent Fox PLLC

(57) ABSTRACT

There are provided a control circuit of a DC—DC converter of a synchronous rectification system which can realize rapid lowering of an output voltage with low power consumption at the stop of power supply, and a control method thereof. While a power supply stop signal is at low level, a control part controls an NMOS transistor according to the output signals of a comparator and a flip-flop circuit. While the power supply stop signal is at high level, the control part masks a reverse current detection signal and the output signal of the flip-flop circuit to control the NMOS transistor according to a detection signal of a comparator. When a choke coil current is reversely flowed and an output voltage is lowered to an output reference voltage corresponding to a reference voltage, the NMOS transistor is brought to the non-conductive state to regenerate the electric power to an input terminal.

16 Claims, 6 Drawing Sheets

CIRCUIT DIAGRAM OF CURRENT CONTROL TYPE DC-DC CONVERTER 1
ACCORDING TO FIRST EMBODIMENT

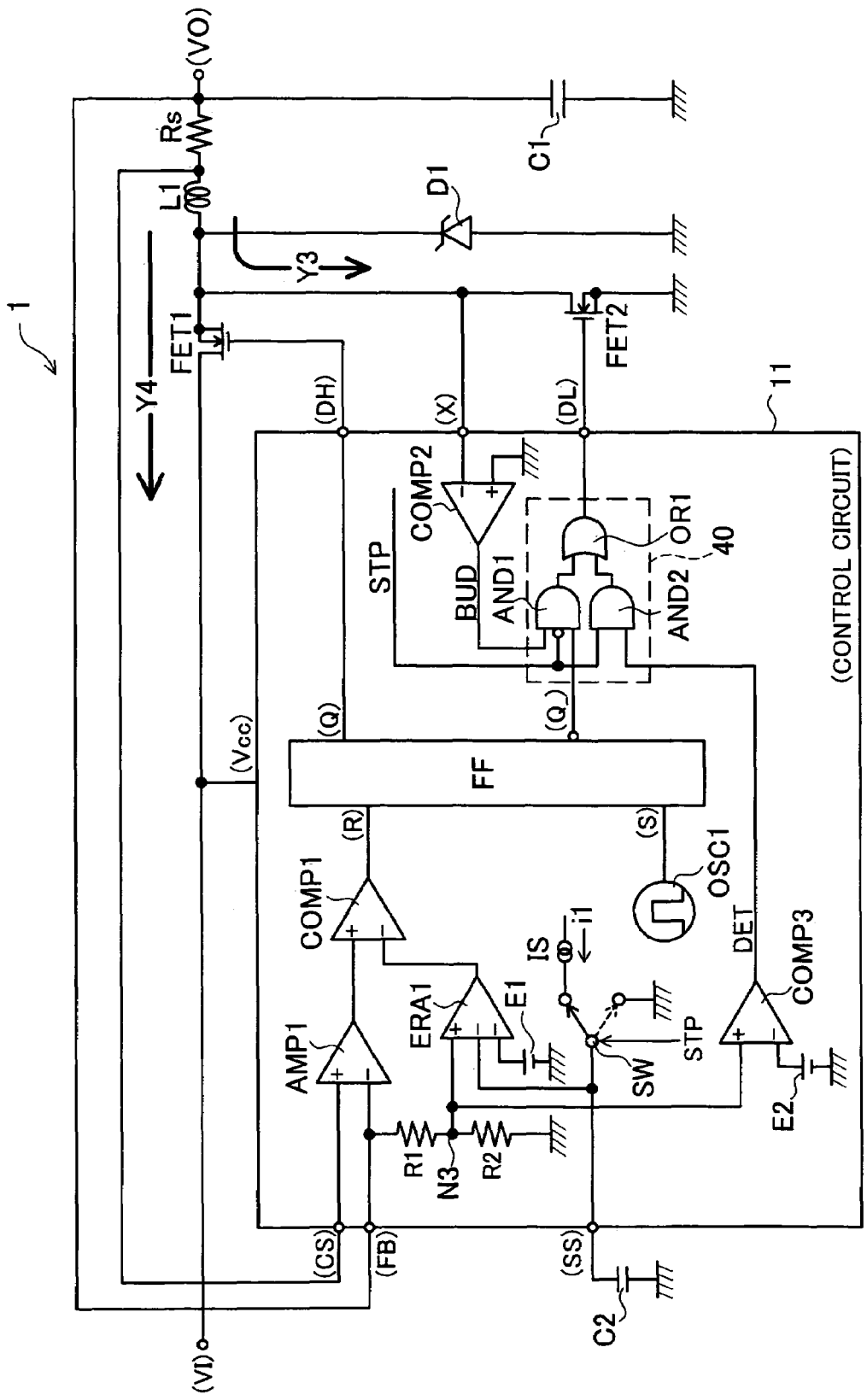
FIG. 1  CIRCUIT DIAGRAM OF CURRENT CONTROL TYPE DC-DC CONVERTER 1 ACCORDING TO FIRST EMBODIMENT

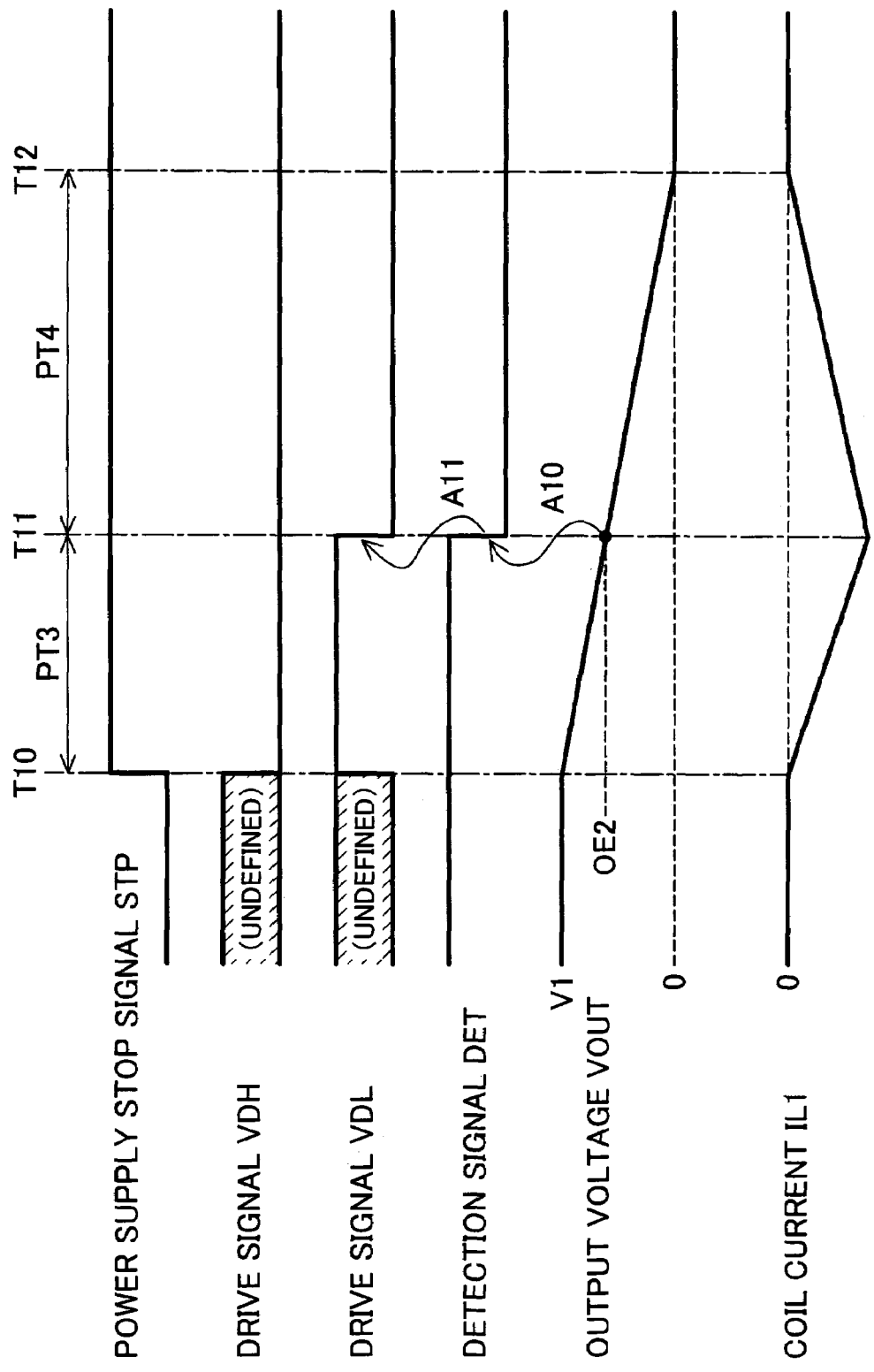

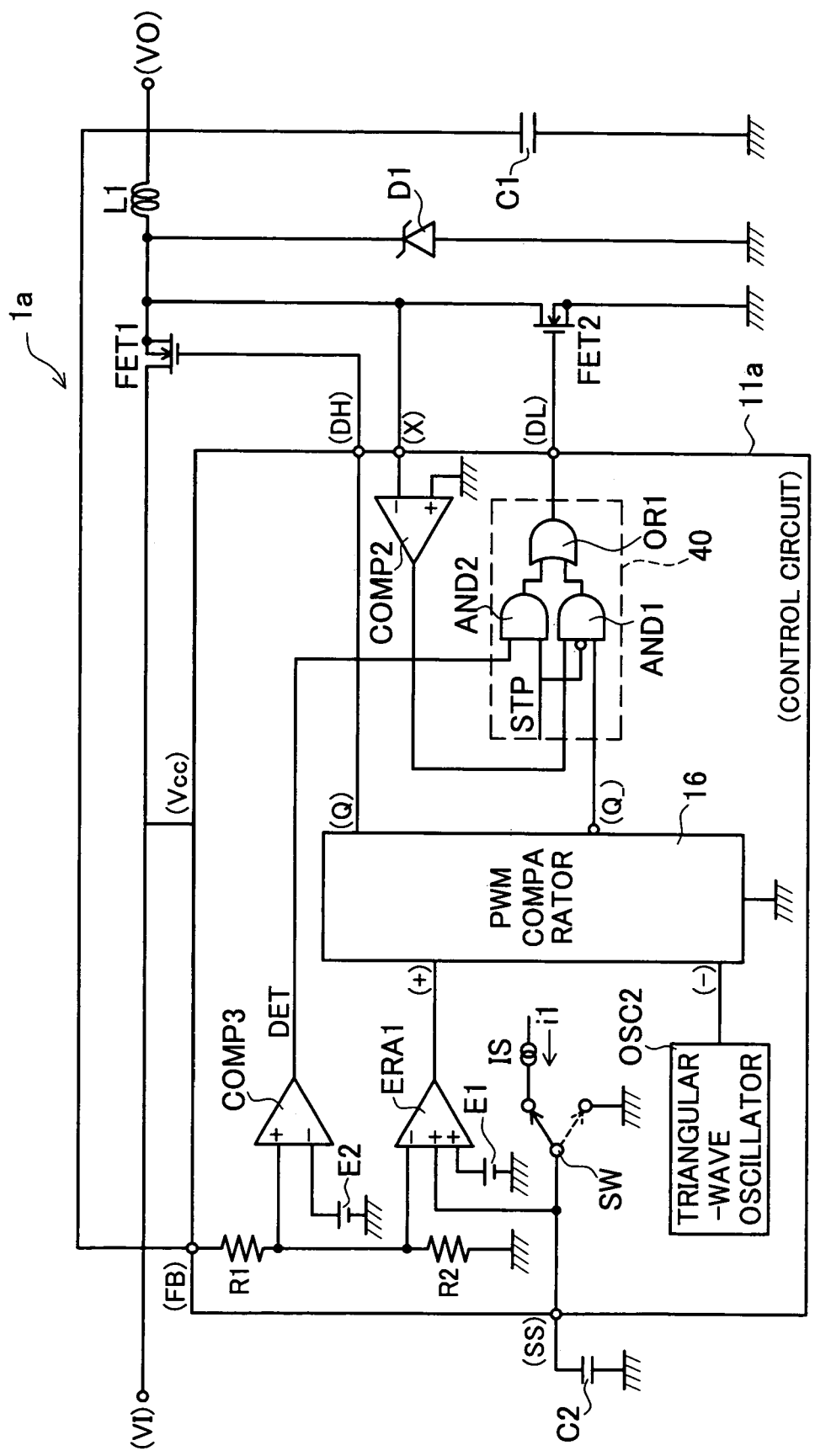
FIG. 3  CIRCUIT DIAGRAM OF VOLTAGE CONTROL TYPE DC-DC CONVERTER 1a ACCORDING TO SECOND EMBODIMENT

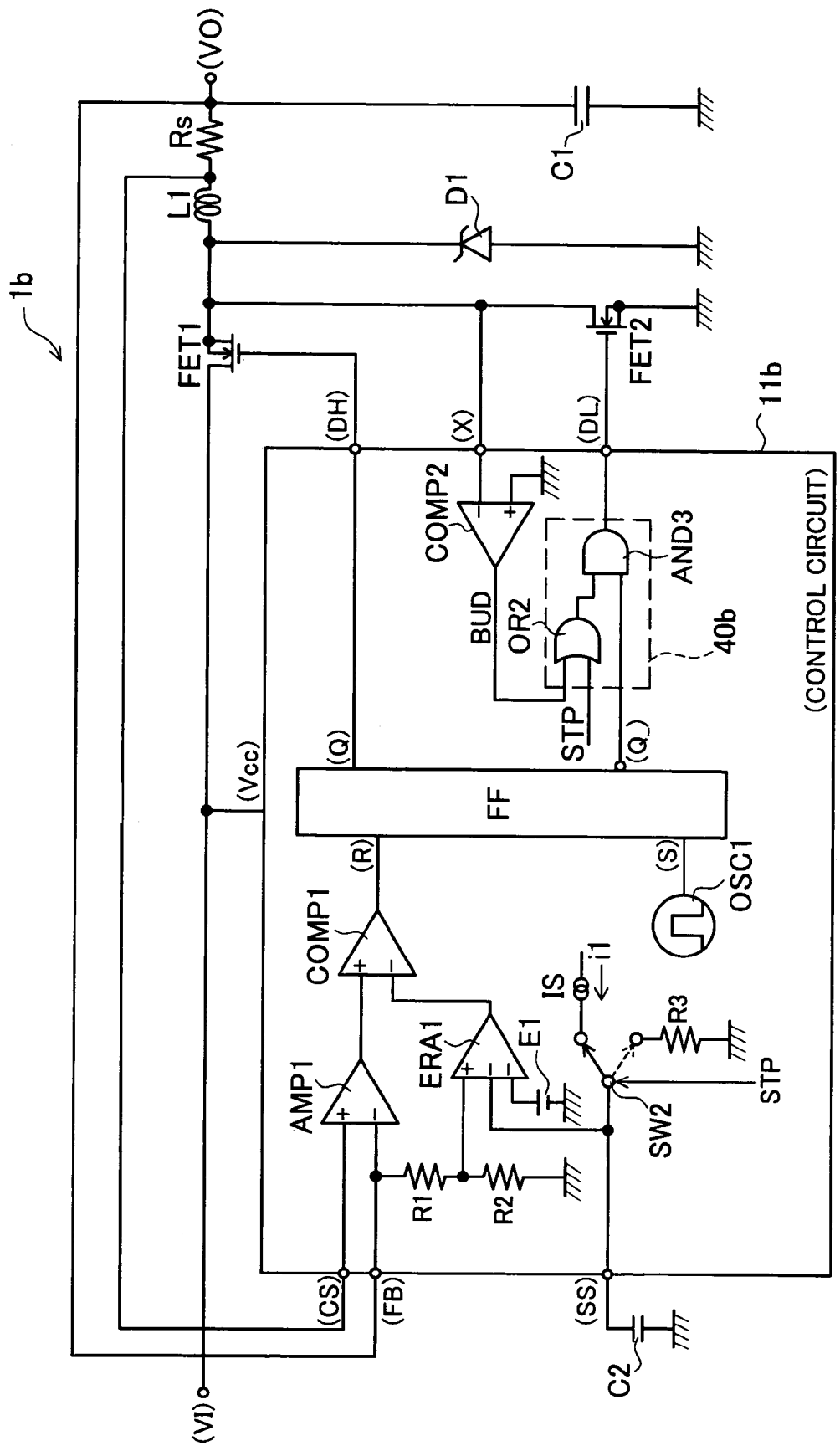
FIG. 4  CIRCUIT DIAGRAM OF CURRENT CONTROL TYPE DC-DC CONVERTER 1b ACCORDING TO THIRD EMBODIMENT

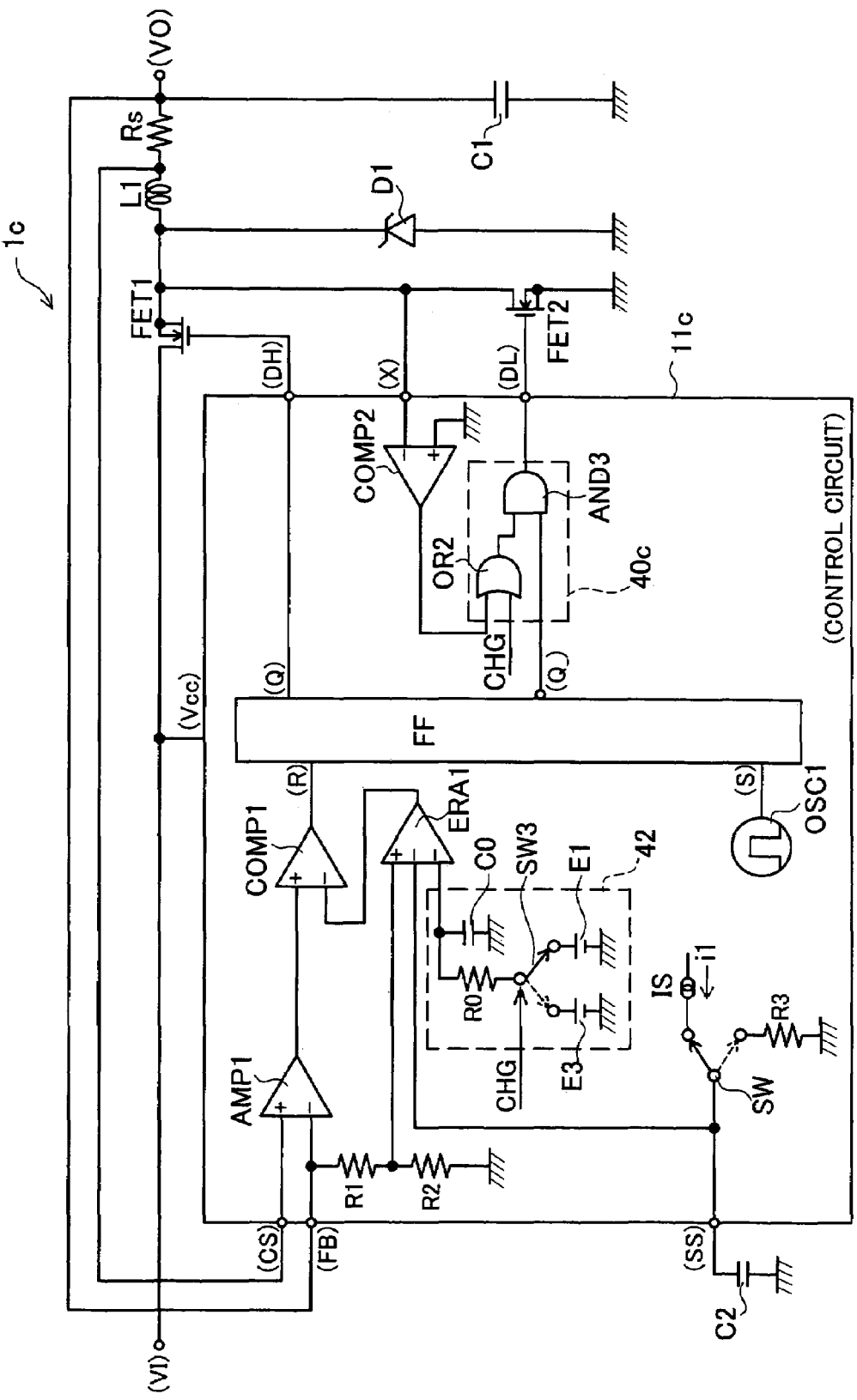
FIG. 5  CIRCUIT DIAGRAM OF CURRENT CONTROL TYPE DC–DC CONVERTER 1c ACCORDING TO FOURTH EMBODIMENT

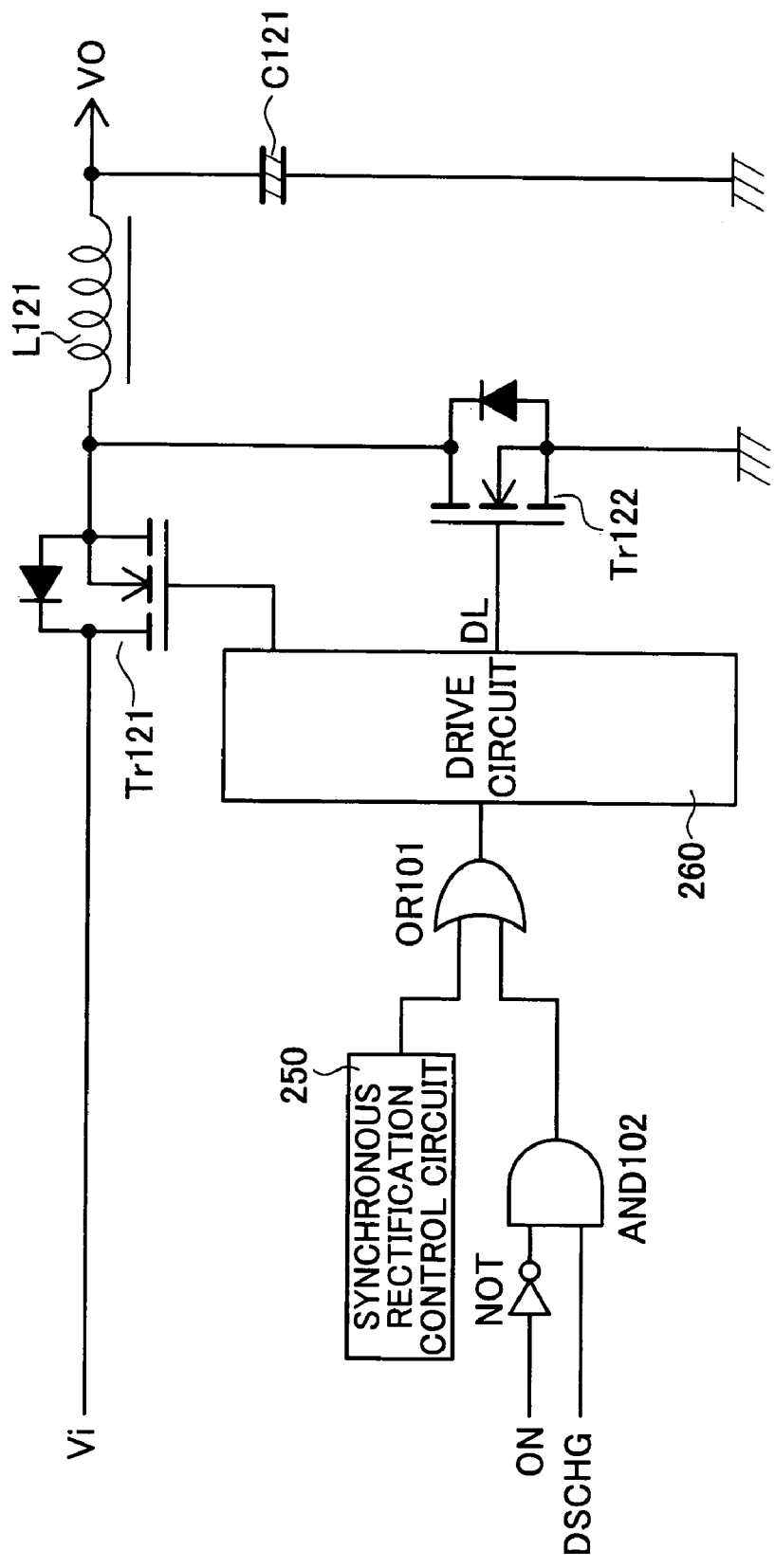
FIG. 6  CIRCUIT DIAGRAM OF PRIOR ART DC-DC CONVERTER OF SYNCHRONOUS RECTIFICATION SYSTEM

CONTROL CIRCUIT OF DC—DC CONVERTER AND CONTROL METHOD THEREOF

CROSS-REFERENCE TO RELATED APPLICATIONS

This application is based upon and claims the benefit of priority from the prior Japanese Patent Application No. 2004-288533 filed on Sep. 30, 2004, the entire contents of which are incorporated herein by reference.

BACKGROUND OF THE INVENTION

1. Field of the Invention

The present invention relates to the control of a DC—DC converter. More specifically, the present invention relates to the control of an output voltage with the stop of operation and the change in a set output voltage in a DC—DC converter of a synchronous rectification system.

2. Description of Related Art

Portable type electronic equipment uses a battery as a power source. The electric power of the battery is discharged with time according to power consumption with the operation of the equipment. The output voltage of the battery is lowered. To maintain the voltage value of the power source of the equipment constant to the change in the battery voltage with time, the DC—DC converter makes the voltage of supplied power constant.

Electronic equipment may use a plurality of voltage sources having different voltage values. A DC—DC converter may be provided for each of the voltage sources. In this case, with the start and stop of the electronic equipment, it is important that start and stop be performed in suitable order in consideration of the start and stop sequence of the voltage sources. Unless the order of the start and stop sequence is suitable, a semiconductor device constructing the electronic equipment can cause a latchup phenomenon in which the state of applying a forward bias to a PN junction part is maintained to continuously flow an undesired electric current. Upon occurrence of the latchup phenomenon, in the case of limiting no electric currents, the semiconductor device can be burnt.

To avoid these disadvantages, when the DC—DC converter is stopped, regardless of a heavy or light load, electric power stored in the capacitance on the load side such as an output capacitor must be efficiently drawn out to rapidly lower an output voltage. The rapid lowering of the output voltage can prevent the power source from remaining at stop and from performing unexpected operation. The start operation can be performed in the state that there is no remaining voltage in the voltage source to suitably perform the start sequence of the voltage source.

At stop, to efficiently draw out electric power stored in the capacitance on the load side such as an output capacitor for rapidly lowering an output voltage, a capacitance discharge path such as a bleeder resistance may be provided, which is not preferable because the path constantly consumes the electric power. Accordingly, for instance, a technique for forming a capacitance discharge path as needed as disclosed in Japanese unexamined patent publication No. H9 (1997)-154275 is proposed.

In a DC—DC converter of a synchronous rectification system shown in FIG. 6, in the operation state, energy stored in a choke coil L121 by the conduction of a main transistor Tr121 is discharged to an output voltage side VO by the conduction of a transistor for synchronous rectification Tr122 in the non-conductive period of the main transistor Tr121. The conductive control of the transistor for synchronous rectification Tr122 is performed by a synchronous rectification control circuit 250.

At stop, an ON signal ON is brought to low level. At this time, when a DSCHG signal is at high level, an AND circuit AND102 also outputs high level. An OR circuit OR101 constantly outputs high level regardless of the synchronous rectification control circuit 250. The transistor for synchronous rectification Tr122 is constantly brought to the conductive state via a drive circuit 260. The main transistor Tr121 is non-conductive by low level of the ON signal ON. At the same time, the conduction of the transistor for synchronous rectification Tr122 short-circuits the output side VO to the ground potential to forcefully discharge the capacitance on the load side.

SUMMARY OF THE INVENTION

When the DC—DC converter shown in the prior art forcefully discharges the capacitance on the load side at stop, the conduction of the transistor for synchronous rectification Tr122 connects one end of the choke coil L121 to the ground potential. The other end of the choke coil L121 is connected to the output side VO. At this point, the output voltage is considered to remain. In particular, in the light load state, a voltage value close to a predetermined output voltage regulated in the operation state remains. The capacitance on the load side including an output capacitor C121 is in the state that energy according to the output voltage is stored. The conduction of the transistor for synchronous rectification Tr122 increases the discharge current at a gradient according to (the voltage across terminals of the choke coil)/(inductance of the choke coil). According to the increased electric current, the energy stored in the output capacitor is sequentially moved to the choke coil L121.

In Japanese unexamined patent publication No. H9(1997)-154275, the energy stored in the output capacitor C121 is consumed via the ground potential with increase in the discharge current to be stored in the choke coil L121. Finally, the energy stored in the choke coil L121 is flowed as the discharge current to be consumed. The energy remaining on the output side VO is consumed with the stop of the DC—DC converter. The electric power is wastefully consumed.

The total amount of the energy stored in the choke coil L121 is limited according to its inductance value. The transistor for synchronous rectification Tr122 continues to be conductive at stop. The stored energy to the choke coil L121 is continuously increased. When the conductive state of the transistor for synchronous rectification Tr122 is continued exceeding the allowed stored energy, the choke coil L121 can be magnetically saturated. An overcurrent flowing with the magnetic saturation can damage the transistor for synchronous rectification Tr122 and other components. The characteristic of the choke coil L121 itself can be deteriorated.

Electronic equipment may change a source voltage value according to the state of the load. When changing to a lower voltage value in the light load state, it is desirable that an output voltage supplied from the DC—DC converter be rapidly lowered. Also in this case, excessive energy stored in the output capacitor must be rapidly drawn out. In the method of Japanese unexamined patent publication No. H9(1997)-154275, it is difficult to regulate the drawn-out output voltage.

The present invention has been made to solve at least one of the prior art problems. An object of the present invention is to provide a control circuit of a DC—DC converter of a synchronous rectification system which can realize rapid lowering of an output voltage with low power consumption by rapidly lowering the output voltage while regenerating energy stored in the capacitance component on the load side to the input side, regardless of a heavy or light load, at the stop of power supply and a control method thereof.

To achieve the object, a DC—DC converter control circuit according to a first invention which controls a first switching device brought into conduction when electric power is stored in an inductive device and a second switching device switching controlled and brought into conduction according to the period of the discharge of the electric power stored in the inductive device to a load, has a reverse current detection part detecting an electric current in the reverse direction of the discharge of the electric power to the load to output a reverse current detection signal; and a control part which is a circuit bringing the second switching device to the non-conductive state according to the reverse current detection signal and neglects the reverse current detection signal according to a predetermined signal instructing lowering of a load application voltage applied to the load to bring the second switching device to the non-conductive state according to the load application voltage.

A DC—DC converter control method according to the first invention which controls a first current path brought into conduction when electric power is stored in an inductive device and a second current path brought into conduction according to the period of the discharge of the electric power stored in the inductive device to a load, includes detecting an electric current in the reverse direction of the discharge of the electric power to the load to output a reverse current detection signal; bringing the second switching device to the non-conductive state according to the reverse current detection signal; and neglecting the reverse current detection signal according to a predetermined signal instructing lowering of a load application voltage applied to the load to bring the second switching device to the non-conductive state according to the load application voltage.

In the DC—DC converter control circuit or control method according to the first invention, the second switching device or the second current path is switching controlled and brought into conduction according to the period of the discharge of the electric power stored in the inductive device to the load. The voltage across terminals of the inductive device is inverted to flow an electric current at a negative gradient with time; the synchronous rectification operation is performed. The reverse current detection part detects an electric current flowing in the reverse direction of the discharge of the electric power to the load. The control part is a circuit bringing the second switching device to the non-conductive state according to the reverse current detection signal in the normal regulating operation. The control part neglects the reverse current detection signal according to a predetermined signal lowering a load application voltage applied to the load to bring the second switching device to the non-conductive state according to the load application voltage.

When discharging the stored electric power of the inductive device, the second switching device or the second current path is brought into conduction to invert the voltage across terminals of the inductive device from that at the storing of electric power. At this point, the electric power is stored according to an electric current flowing to the inductive device. The electric current is a peak current. The electric power is discharged as the time gradient of the electric current flowing to the load is decreased with time. When the electric current value of the electric current is zero, the discharge of the electric power is completed. The conduction of the second switching device or the second current path is maintained. The current direction of a first electric current is inverted to start flowing an electric current from the load to the inductive device.

In the prior art DC—DC converter control circuit, as the reverse current detection part detects an electric current in the reverse direction of the discharge of the electric power to the load to output the reverse current detection signal, the second switching device is brought to the non-conductive state. The control part of the DC—DC converter control circuit according to the present invention neglects the reverse current detection signal according to a predetermined signal instructing lowering of the load application voltage applied to the load. When the reverse flow of an electric current from the load to the inductive device is started, the second switching device is not non-conductive to allow the reverse flow of the electric current. According to this, the electric power on the load side is moved to the inductive device to be stored. When the electric power discharged to the load side is excessive in the state that power consumption in the load is less, the conductive state of the second switching device or the second current path is maintained beyond the electric power discharge period of the inductive device to make it possible to return the excessive electric power to the inductive device.

When the second switching device or the second current path is non-conductive according to the load application voltage applied to the load, the electric power returned to the inductive device is regenerated to the input side to make it possible to return the excessive electric power to the input side. This can regenerate the excessive electric power stored on the load side to avoid waste power consumption. The electric power conversion efficiency of the DC—DC converter can be improved. This can be done by providing a device having a rectifying function from the inductive device to the input side. When using a MOS transistor as the first switching device or the first current path, the body diode of the MOS transistor is used to make it possible to perform regeneration.

A pseudo load such as a bleeder resistance need not be provided on the load side. Without additional power consumption with the bleeder resistance, the excessive electric power returned to the inductive device can be regenerated to the input side. The electric power conversion efficiency can be improved.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a circuit diagram of a current control type DC—DC converter 1 according to a first embodiment;

FIG. 2 is a timing chart when stopping power supply of the DC—DC converter 1;

FIG. 3 is a circuit diagram of a voltage control type DC—DC converter 1a according to a second embodiment;

FIG. 4 is a circuit diagram of a current control type DC—DC converter 1b according to a third embodiment;

FIG. 5 is a circuit diagram of a current control type DC—DC converter 1c according to a fourth embodiment; and FIG. 6 is a circuit diagram of a prior art DC—DC converter of a synchronous rectification system.

DETAILED DESCRIPTION OF THE PREFERRED EMBODIMENTS

Embodiments embodying a control circuit of a DC—DC converter and a control method thereof according to the present invention will be described below in detail with reference to the drawings based on FIGS. 1 to 5.

A first embodiment of the present invention will be described using FIGS. 1 and 2. FIG. 1 is a circuit diagram of a current control type DC—DC converter 1 of a synchronous rectification type switching system according to the first embodiment. Means for on/off controlling an NMOS transistor FET2 as a synchronous rectification switch circuit at the stop of the power supply operation of the DC—DC converter 1 is provided to reversely flow electric power stored in the capacitance on the load side via the NMOS transistor FET2 to a choke coil L1 for regenerating it to the input side so that an output voltage VOUT of the DC—DC converter 1 is rapidly lowered.

An input terminal (VI) to which an input voltage VIN is inputted is connected to the drain terminal of an NMOS transistor FET1. The source terminal of the NMOS transistor FET1 is connected to one terminal of the choke coil L1 and the drain terminal of the NMOS transistor FET2. The source terminal of the NMOS transistor FET2 is connected to the ground potential. The gate terminals of the NMOS transistors FET1 and FET2 are connected to output terminals (DH) and (DL) of a later-described control circuit 11. The NMOS transistor FET1 is a main transistor for switching and is on/off controlled by a control part 40. The NMOS transistor FET2 is a switch for synchronous rectification brought to the on state while the NMOS transistor FET1 as a main transistor is off for discharging the energy stored in the choke coil L1.

The anode terminal of a diode device D1 is connected to the ground potential and the cathode terminal thereof is connected to one terminal of the choke coil L1. The diode device D1 is a flywheel diode for discharging the energy stored in the choke coil L1. It is provided to assist the NMOS transistor FET2 having a rectifying function by the later-described switching operation. The other terminal of the choke coil L1 for converting voltage is connected via a sense resistance device Rs to an output terminal (VO). The input voltage VIN is dropped to be outputted as the output voltage VOUT. The sense resistance device Rs is a current sense resistance for detecting an electric current flowed to the choke coil L1. An output capacitor C1 is connected between the output terminal (VO) and the ground potential. In the output capacitor C1, electric power supplied via the choke coil L1 is stored to smoothen output.

In general, the source terminals of the NMOS transistors FET1 and FET2 are connected to the back gate terminals of the NMOS transistors FET1 and FET2. The back gate terminal is a well part in the MOS transistor inner structure and is a p-type conductive layer in the NMOS transistor. In the NMOS transistors FET1 and FET2, the PN junction structure is generally formed from the source terminal via the back gate terminal to the drain terminal. It is the so-called body diode structure. With the body diode, the NMOS transistors FET1 and FET2 have a rectifying function in the reverse direction of the normal current direction.

The control circuit 11 conduction controls the NMOS transistors FET1 and FET2 alternately and performs control maintaining the output voltage VOUT to a predetermined voltage value when dropping the input voltage VIN inputted from the input terminal (VI) to supply electric power to the output terminal (VO). The input terminal (VI) of the control circuit 11 is connected to a power terminal (VCC) to supply the input voltage VIN as a source voltage. FIG. 1 illustrates a circuit construction in which the regulating operation is performed by current mode control performing the switching operation using a flip-flop circuit FF, an oscillator OSC1, and a comparator COMP1.

A terminal (CS) and a terminal (FB) connected to both terminals of the sense resistance device Rs are connected to the non-inverting input terminal and the inverting input terminal of an amplifier AMP1 to amplify the voltage across terminals of the sense resistance device Rs. The terminal (FB) connected to the output terminal (VO) is connected to a junction N3 as one terminal of a resistance device R1 connected via a resistance device R2 to the ground potential. The resistance devices R1 and R2 are voltage division resistances for dividing the output voltage VOUT and are set so that the divided result when the output voltage VOUT is the standard value is the same as a reference voltage E1. An error amplifier ERA1 is a voltage amplifier having one non-inverting input and two inverting inputs. The non-inverting input of the error amplifier ERA1 is connected to the junction N3. One of the two inverting inputs of the error amplifier ERA1 is connected to the reference voltage E1. The other inverting input is connected to a terminal (SS) and a switch circuit SW. The error amplifier ERA1 performs the operation amplifying the difference between the lower voltage of the two inverting inputs and the voltage of the non-inverting input.

One end of a capacitor C2 is connected to the ground potential and the other is connected to the terminal (SS). The capacitor C2 is a capacitor for soft-start. The terminal (SS) is connected to the inverting input terminal of the error amplifier ERA1 and the switch circuit SW. The switch circuit SW is constructed so that one of a constant-current circuit IS or the ground potential can be selected. The selection of the constant-current circuit IS charges the capacitor C2. The selection of the ground potential discharges the capacitor C2. When the DC—DC converter 1 is stopped, the terminal (SS) is connected to the ground potential so that the electric charge of the capacitor C2 is discharged to set its potential to 0V. When the terminal (SS) is connected to the constant-current circuit IS, the capacitor C2 is charged to increase the potential of the capacitor C2 in a fixed time.

A reference voltage E2 is applied to the inverting input terminal of a comparator COMP3. The non-inverting input terminal is connected to the junction N3. The output terminal of the comparator COMP3 is connected to the input terminal of an AND gate circuit AND2.

The output terminal of the amplifier AMP1 and the output terminal of the error amplifier ERA1 are connected to the non-inverting input terminal and the inverting input terminals of the comparator COMP1. The output terminal of the comparator COMP1 is connected to a reset terminal (R) of the flip-flop circuit FF. A set terminal (S) of the flip-flop circuit FF is triggered by the oscillator OSC1 oscillated in a predetermined cycle. An output terminal (Q) of the flip-flop circuit FF is connected to the output terminal (DH) of the control circuit 11. An inverted output terminal (Q_) of the flip-flop circuit FF is connected to an AND gate circuit AND1.

The inverting input terminal of a comparator COMP2 is connected via a terminal (X) to one terminal of the choke coil L1. The non-inverting input terminal is connected to the ground potential. The output terminal of the comparator COMP2 is connected to the input terminal of the AND gate circuit AND1. The inverted state of a coil current IL1 is detected to output a reverse current detection signal BUD from the comparator COMP2.

A power supply stop signal STP is inputted to the AND gate circuits AND1 and AND2. The power supply stop signal STP is a signal which is at high level while the DC—DC converter 1 stops the power supply operation and which is at low level during the start of the power supply operation or the operation. The output terminal of the comparator COMP3 is connected to the input terminal of the AND gate circuit AND2. The input terminal of an OR gate circuit OR1 is connected to the output terminals of the AND gate circuits AND1 and AND2. The output terminal of the OR gate circuit OR1 is connected to the output terminal (DL). The error amplifier ERA1, the reference voltage E1, the capacitor C2, the switch circuit SW, the constant-current circuit IS, the comparator COMP3, and the reference voltage E2 construct a monitoring part monitoring the output voltage of the DC—DC converter 1. The comparator COMP3 and the reference voltage E2 construct a detection part detecting that the output voltage VOUT is equal to or below a later-described output reference voltage OE2. The comparator COMP2 constructs a reverse current detection part.

When the load as the power receiving side of the DC—DC converter 1 is brought to the standby state or the stop state to be in the extremely light load state, the circuit operation when stopping power supply of the DC—DC converter 1 will be described by FIG. 2.

When the power supply operation of the DC—DC converter 1 is stopped at time T10, the output of the flip-flop circuit FF is stopped to stop the regulating operation. The output level of the output terminal (Q) is brought to low level to switch the power supply stop signal STP from low to high level. The operation on the load side is also in the stop state. The coil current IL1 is 0 (A). The output voltage VOUT is an output voltage set value V1 (V). Drive signals VDH and VDL are both in the undefined state. The power supply stop signal STP at high level which is inverted to low level is inputted to the AND gate circuit AND1 of the control part 40. The output signal of the AND gate circuit AND1 is determined to be at low level. The reverse current detection signal BUD outputted from the comparator COMP2 and the output signal of the inverted output terminal (Q_) of the flip-flop circuit FF are masked by the AND gate circuit AND1. The comparator COMP2 and the flip-flop circuit FF prohibit the NMOS transistor FET2 from being controlled.

The power supply stop signal STP at high level is inputted to the AND gate circuit AND2. The AND gate circuit AND2 performs the operation passing the output signal of the comparator COMP3 as it is to output it to the OR gate circuit OR1. A detection signal DET outputted from the comparator COMP3 controls the NMOS transistor FET2.

When the power supply stop signal STP is at low level, the control part 40 controls the NMOS transistor FET2 according to the output signals of the comparator COMP2 and the flip-flop circuit FF. When the power supply stop signal STP is at high level, the control part 40 masks the reverse current detection signal BUD and the output signal of the flip-flop circuit FF to control the NMOS transistor FET2 according to the detection signal DET of the comparator COMP3.

The comparator COMP3 compares a divided voltage value DVO of the output voltage VOUT at the junction N3 with the reference voltage E2. When the divided voltage value DVO is higher than the reference voltage E2, a high level signal is outputted. When it is lower, a low level signal is outputted. The divided result when the output voltage VOUT is the output reference voltage OE2 is set to be the same as the reference voltage E2. At the time T10, the electric power is sufficiently stored in the capacitance on the load side. The divided voltage value DVO is higher than the reference voltage E2. The detection signal DET outputted from the comparator COMP3 is a high level signal. The high level detection signal DET is inputted to the AND gate circuit AND2 of the control part 40. The NMOS transistor FET2 is brought to the conductive state.

When the NMOS transistor FET2 is brought to the conductive state, a current path is formed from the ground potential via the NMOS transistor FET2 to the choke coil L1. The output voltage VOUT is applied to the terminal on the output terminal (VO) side where the voltage on the input terminal (VI) side of the choke coil L1 is substantially equal to the ground potential. The coil current IL1 is flowed from the output terminal (VO) side in the direction toward the choke coil L1 (an arrow Y3 in FIG. 1). This supplies electric power larger than one required by the load in the light load state. At least part of the electric power stored in the output capacitor C1 as excessive electric power is returned to the choke coil L1. The gradient is $di/dt=-VOUT/L$ when the inductance of the choke coil L1 is L by the physical characteristic of the inductance device (a period PT3 in FIG. 2).

The choke coil current is reversely flowed. The output voltage VOUT is lowered to the output reference voltage OE2 corresponding to the reference voltage E2 (time T11). The detection signal DET outputted from the comparator COMP3 is transited from high to low level (an arrow A10). The drive signal VDL outputted from the terminal (DL) is brought to low level (an arrow A11). The NMOS transistor FET2 as a synchronous rectification circuit is brought to the non-conductive state.

When the NMOS transistor FET2 is brought to the non-conductive state, an electric current flowing to the choke coil L1 attempts to continuously flow. The choke coil L1 discharges in a period PT4 the energy returned from the output terminal (VO) side and stored in the period PT3. In the period PT4, the electric power stored in the choke coil L1 is regenerated via the body diode of the NMOS transistor FET1 to the input terminal (VI) (an arrow Y4 in FIG. 1). At time T12, the coil current IL1 and the output voltage VOUT are both zero to terminate the regenerating operation.

The switching control of the NMOS transistor FET2 in the periods PT3 and PT4 constructs a boosting type DC—DC converter supplying electric power from the output terminal (VO) to the input terminal (VI), combined with the body diode of the NMOS transistor FET1. The energy regenerated to the input side which is obtained by adding the energy of the output capacitor C1 to the energy stored in the choke coil L1 is regenerated to the input side.

To regenerate all electric power on the load side and to prevent occurrence of resonance, at the time T12 as the completion point of the regenerating operation, it is desirable that the reference voltage E2 be set so that the output voltage VOUT and the coil current IL1 are just 0. In order that the output voltage VOUT and the coil current IL1 are zero at the completion point of the regenerating operation, the reference voltage E2 may be set so that at the timing in which half of the electric power stored in the output capacitor C1 is stored in the choke coil L1, the NMOS transistor FET2 is transited to the non-conductive state to be moved to the regenerating operation.

A method of calculating the set value of the reference voltage E2 will be described. When the set value of the output voltage of the DC—DC converter 1 is the output voltage set value V1 and the capacitance on the load side is C, a total energy amount PWC stored in the capacitance on the output side at the stop of power supply are given by the following equation.

$$PWC=(\tfrac{1}{2})\times C\times V1^2 \qquad (1)$$

When determining the output voltage VOUT in the case that half of the total energy amount PWC is stored in the choke coil L1, the following equation is established.

$$(\tfrac{1}{2})\times C\times VOUT^2=(\tfrac{1}{2})\times(\tfrac{1}{2})\times C\times V1^2 \qquad (2)$$

When summing up the equation (2), equation (3) is obtained.

$$VOUT=(\tfrac{1}{2})\times V1 \qquad (3)$$

It is found that the reference voltage E2 may be set so that the value of the output reference voltage OE2 is ($\tfrac{1}{2}$) times the output voltage set value V1.

As described above in detail, in the control circuit 11 according to the first embodiment, the electric power stored in the capacitance on the load side is reversely flowed to the choke coil L1 with the stop of the regulating operation. While regenerating the electric power to the input side, the excessive electric power stored on the load side of the DC—DC converter 1 can be rapidly lowered. The electric power returned to the inductive device is regenerated to the input side after the NMOS transistor FET2 is brought to the non-conductive state. The excessive electric power can be returned to the input side. The electric power conversion efficiency of the DC—DC converter can be improved.

A pseudo load such as a bleeder resistance need not be provided on the load side. Without additional power consumption with the bleeder resistance, the excessive electric power returned to the inductive device can be regenerated to the input side. The electric power conversion efficiency can be improved. At the timing in which half of the electric power stored in the output capacitor C1 is stored in the choke coil L1, the NMOS transistor FET2 is transited to the non-conductive state to be moved to the regenerating operation. All the electric power on the load side can be regenerated. Occurrence of resonance of the DC—DC converter 1 can be prevented.

A second embodiment of the present invention will be described using FIG. 3. The first embodiment is an embodiment of a current control type DC—DC converter. The second embodiment is an embodiment according to a voltage control type DC—DC converter.

FIG. 3 is a circuit diagram of a voltage control type DC—DC converter 1a of a synchronous rectification type switching system according to a second embodiment. A control circuit 11a of FIG. 3 has a PWM comparator 16 and a triangular-wave oscillator OSC2 in place of the flip-flop circuit FF and the oscillator OSC1 of the control circuit 11 of FIG. 1. The amplifier AMP1 and the comparator COMP1 of the control circuit 11 of FIG. 1 are not provided in the control circuit 11a of FIG. 3. The PWM comparator 16 is a voltage comparator having one inverting input and one non-inverting input, and a voltage pulse width converter comparing the non-inverting input with the inverting input and outputting a pulse when the voltage of the non-inverting input is higher than that of the inverting input. The output of the triangular-wave oscillator OSC2 is inputted to the inverting input of the PWM comparator 16. The output of the error amplifier ERA1 is inputted to the non-inverting input. As compared with the DC—DC converter 1 of FIG. 1, the DC—DC converter 1a of FIG. 3 is not provided with the sense resistance device Rs and the terminal (CS). The error amplifier ERA1, the reference voltage E1, the capacitor C2, the switch circuit SW, and the constant-current circuit IS construct a monitoring part monitoring the output voltage of the DC—DC converter 1a. Other circuit construction is the same as the DC—DC converter 1 (FIG. 1) according to the first embodiment, and the description is omitted here.

When the power receiving side of the DC—DC converter 1a is brought to the standby state or the stop state and is in the extremely light load state, the circuit operation when stopping the power supply operation of the DC—DC converter 1a will be described with FIG. 3. When the power supply operation of the DC—DC converter 1a is brought to the stop operation, the power supply stop signal STP is transited from low to high level. The power supply stop signal STP at high level which is inverted to low level is inputted to the AND gate circuit AND1 of the control circuit 11a. The inverted output of the PWM comparator 16 is masked by the AND gate circuit AND1. This prevents the NMOS transistor FET2 from being controlled by the PWM comparator 16. The power supply stop signal STP at high level is inputted to the AND gate circuit AND2. The AND gate circuit AND2 passes the detection signal DET outputted from the comparator COMP3 as it is. The detection signal DET controls the NMOS transistor FET2. When the power supply stop signal STP is at high level, the control part 40 controls the NMOS transistor FET2 according to the detection signal DET outputted from the comparator COMP3.

The power supply operation of the DC—DC converter 1a is stopped to stop the output of the PWM comparator 16. The output level of the output terminal (Q) is fixed to low level. The NMOS transistor FET1 is brought to the non-conductive state. The power supply stop signal STP is switched from low to high level.

The same operation of the DC—DC converter 1 according to the first embodiment is performed. The description of the detailed operation is omitted here. The electric power stored in the capacitance on the load side is reversely flowed to the choke coil L1. While regenerating the electric power to the input side, the output voltage VOUT of the DC—DC converter 1a can be rapidly lowered.

As described above in detail, the control circuit 11a according to the second embodiment stops the regulating operation in the voltage control type DC—DC converter 1a and reversely flows the electric power stored in the capacitance on the load side to the choke coil L1. While regenerating the electric power to the input side, excessive power stored on the load side of the DC—DC converter 1a can be rapidly lowered. The electric power returned to the inductive device can be regenerated to the input side. The electric power conversion efficiency of the DC—DC converter 1a can be improved.

A third embodiment of the present invention will be described using FIG. 4. A control circuit 11b of a DC—DC converter 1b (FIG. 4) according to the third embodiment is a control circuit having means for lowering the reference voltage of the error amplifier ERA1 controlling the output voltage of the DC—DC converter 1b with time, and means for forcefully continuing the switching operation at a fixed frequency after stopping the power supply of the DC—DC converter 1b. After stopping the power supply of the DC—DC converter 1b, it is a control circuit which can gradually lower the output voltage VOUT in a predetermined time while boosting the output voltage of the DC—DC converter using the NMOS transistor FET2 to returning it to the input side.

The control circuit 11b of FIG. 4 has a switch circuit SW2, a resistance device R3, and a control part 40b in place of the switch circuit SW and the control part 40 of the control circuit 11 of FIG. 1. The control part 40b has an OR gate circuit OR2 and an AND gate circuit AND3. The reverse current detection signal BUD and the power supply stop signal STP outputted from the comparator COMP2 are inputted to the OR gate circuit OR2. The output terminal of the OR gate circuit OR2 and the inverted output terminal (Q_) of a flip-flop circuit FF are connected to the AND gate circuit AND3. The output terminal of the AND gate circuit AND3 is connected to the output terminal (DL). The power supply stop signal STP is inputted to the switch circuit SW2. The resistance device R3 is provided between the switch circuit SW2 and the ground potential. The capacitor C2, the switch circuit SW2, and the resistance device R3 construct a reference voltage part. The switch circuit SW2 and the resistance device R3 construct a discharge part forming an electric charge discharge path. The error amplifier ERA1, the reference voltage E1, the capacitor C2, the switch circuit SW2, the constant-current circuit IS, and the resistance device R3 construct a monitoring part monitoring the output voltage of the DC—DC converter 1b. Other construction is the same as the control circuit 11 according to the first embodiment and the description is omitted here.

While starting or operating the DC—DC converter 1b, the power supply stop signal STP at low level is inputted to the OR gate circuit OR2. The OR gate circuit OR2 performs the operation for passing the reverse current detection signal BUD outputted from the comparator COMP2 as it is to output it to the AND gate circuit AND3. It performs the same operation as the DC—DC converter 1 according to the first embodiment.

The operation when the DC—DC converter 1b stops power supply will be described. When the DC—DC converter 1b is brought to the stop operation, the power supply stop signal STP is switched from low to high level. The power supply stop signal STP at high level is inputted to the OR gate circuit OR2. The output signal of the OR gate circuit OR2 is defined as high level. The reverse current detection signal BUD of reverse flow prevention control of an electric current outputted from the comparator COMP2 to the choke coil L1 is masked by the OR gate circuit OR2. The NMOS transistor FET2 is constantly controlled by the inverted output of the flip-flop circuit FF. After the power supply stop signal STP is transited to high level, the regulating operation is continued. The flip-flop circuit FF continues the output of the output terminal (Q) and the inverted output terminal (Q_) at a fixed frequency. The NMOS transistor FET1 and the NMOS transistor FET2 are on/off controlled at a fixed frequency.

The switch circuit SW2 connects the terminal (SS) to the resistance device R3 according to the transition of the power supply stop signal STP to high level. The electric charge of the capacitor C2 is discharged by the resistance device R3 to gradually lower the voltage of the terminal (SS). As the voltage of the terminal (SS) as a reference voltage of the error amplifier ERA1 is gradually lowered, the DC—DC converter 1b attempts to lower the output voltage VOUT. After the transition of the power supply stop signal STP to high level, in the initial stage in which the voltage of the terminal (SS) is lowered, the output voltage is continuously maintained by the output capacitor C1. The flip-flop circuit FF performs the reset operation by the comparator COMP1 in a short time after the set operation of the oscillator OSC1. The on-duty of the NMOS transistor FET2 is increased. The coil current IL1 starts reversely flowing via the NMOS transistor FET2 to the choke coil L1.

In the next cycle, the set terminal (S) of the flip-flop circuit FF is triggered by the oscillator OSC1. The NMOS transistor FET2 is brought to the non-conductive state. When the NMOS transistor FET2 is brought to the non-conductive state, an electric current flowing to the choke coil L1 continues to flow to be regenerated via the body diode of the NMOS transistor FET1 to the input VI until the discharge of the stored energy is completed.

By the regenerating function, the output voltage of the DC—DC converter is controlled so as to output a voltage determined by the voltage of the terminal (SS) and is then gradually lowered. The gradient of the output voltage VOUT after the power supply stop signal STP is transited to high level is determined by a discharge time constant of the capacitor connected to the terminal (SS) and can be controlled without depending on the load of the DC—DC converter. The same operation is repeated at a predetermined frequency. After the elapse of a predetermined time, finally, a voltage VST of the capacitor C2 and the output voltage VOUT are both 0(V).

The NMOS transistor FET2 is non-conductive in a predetermined cycle according to the output of the flip-flop circuit FF. The amount of electric power moved from the load side to the choke coil L1 is limited. While preventing excessive electric power from being returned all together from the load side to the choke coil L1, the regenerating operation is performed for each predetermined cycle. The electric power can be gradually returned to the input side. When the load side is in the light load state or in the no-load state, the electric power is not retuned all together and the output voltage can be gradually lowered in a predetermined time. The lowering gradient of the output voltage VOUT at the stop of power supply of the DC—DC converter 1b can be determined by the discharge time constant of the capacitor C2 connected to the terminal (SS) without depending on the load of the DC—DC converter 1b.

As described above in detail, the control circuit 11b according to the third embodiment uses the NMOS transistor FET2 to boost the output voltage of the DC—DC converter 1b to regenerate it to the input side and can gradually lower the output voltage VOUT in a predetermined time. When regenerating electric power exceeding the limit of the total amount of energy stored in the choke coil L1, the regeneration of the electric power is gradually performed. It is possible to prevent an excessive current flowing with the magnetic saturation of the choke coil L1 from damaging the NMOS transistor FET2 and other components. The deterioration of the characteristic of the choke coil L1 itself can be prevented.

A fourth embodiment of the present invention will be described using FIG. 5. A control circuit 11c of a DC—DC converter 1c shown in FIG. 5 is a circuit which can change the output voltage set value V1 of the output voltage VOUT to a lower output voltage set value V2 in a predetermined time without depending on the load of the DC—DC converter 1c. Like the third embodiment, it is a control circuit which can gradually change the output voltage set value V1 to the output voltage set value V2 by gradually lowering the reference voltage E1 to E3.

The control circuit 11c of FIG. 5 has a reference voltage changing part 42 in place of the reference voltage E1 of the control circuit 11b of FIG. 4. The reference voltage changing part 42 has a switch circuit SW3, a resistance device R0, a capacitor C0, and the reference voltages E1 and E3. The inverting input terminal of the error amplifier ERA1 is connected via the capacitor C0 to the ground potential and is connected via the resistance device R0 to the switch circuit SW3. The capacitor C0 and the resistance device R0 construct an integrating circuit determining the time constant of voltage change when switching the reference voltage from the E1 to E3. A changing signal CHG is inputted to the switch circuit SW3 and the OR gate circuit OR2. The error amplifier ERA1, the reference voltage changing part 42, the capacitor C2, the switch circuit SW, the constant-current circuit IS, and the resistance device R3 construct a monitoring part monitoring the output voltage VOUT of the DC—DC converter 1c. Other construction is the same as the DC—DC converter 1 according to the first embodiment and the description is omitted here.

The operation of the DC—DC converter 1c will be described. The operation during the operation or the stop operation of the DC—DC converter 1c is the same as the DC—DC converter 1b according to the third embodiment and the description is omitted here. The operation when the DC—DC converter is brought to the changing operation of the output voltage set value and the output voltage set value is changed from the V1 to V2 will be described. The changing signal CHG is brought to high level according to the start of the changing operation. The switch circuit SW3 performs the operation for switching the reference voltage of the error amplifier ERA1 from the E1 to E3 as the changing signal CHG at high level is inputted.

The changing signal CHG at high level is inputted to the OR gate circuit OR2. The output signal of the OR gate circuit OR2 is defined as high level. The reverse current detection signal BUD of the comparator COMP2 is masked by the OR gate circuit OR2. The NMOS transistor FET2 is continuously controlled by the inverted output of the flip-flop circuit FF. A control part 40c controls the NMOS transistor FET2 according to the reverse current detection signal BUD of the comparator COMP2 and the inverted output of the flip-flop circuit FF while the changing signal CHG is at low level. The control part 40c masks the reverse current detection signal BUD while the changing signal CHG is at high level to control the NMOS transistor FET2 according to the inverted output of the flip-flop circuit FF.

After the reference voltage change notification of the changing signal CHG, the control circuit 11c continues the regulating operation and the flip-flop circuit FF continues the output of the output terminal (Q) and the inverted output terminal (Q_) at a fixed frequency. The NMOS transistor FET1 and the NMOS transistor FET2 are on/off controlled at a fixed frequency.

The resistance device R0 and the capacitor C0 construct an integrating circuit determining a time constant of voltage change when switching the reference voltage from the E1 to E3. When the switch circuit SW3 switches the reference voltage of the error amplifier ERA1 to the reference voltage E3, the reference voltage of the error amplifier ERA1 is gradually changed from the E1 to E3. When the reference voltage of the error amplifier is gradually lowered, the DC—DC converter attempts to lower the output voltage value. When the DC—DC converter 1c has no load, an output capacitor C1 continues to maintain the output voltage set value V1. The on-duty of the NMOS transistor FET2 is increased. The coil current IL1 starts reversely flowing via the NMOS transistor FET2 to the choke coil L1 to perform the regenerating operation of the electric power like the third embodiment.

The output voltage VOUT of the DC—DC converter is rapidly changed from the output voltage set value V1 to V2 in a time of a time constant determined by the resistance device R0 and the capacitor C0. When the changing operation of the output voltage is completed, the changing signal CHG is brought to low level. The DC—DC converter 1c is returned to the normal operation mode to perform the regulating operation so as to output the output voltage set value V2.

As described above in detail, the control circuit 11c according to the fourth embodiment uses the NMOS transistor FET2 to boost the output voltage of the DC—DC converter 1b for regenerating it to the input side and can change the value of the output voltage VOUT in a predetermined time. The gradient of the output voltage VOUT when changing the output voltage of the DC—DC converter 1c can be determined by the time constant of the integrating circuit connected to the error amplifier ERA1 without depending on the load of the DC—DC converter 1b. When regenerating electric power exceeding the limit of the total amount of energy stored in the choke coil L1 at the change of the output voltage, the regeneration of the electric power is gradually performed. It is possible to prevent an overcurrent flowing with the magnetic saturation of the choke coil L1 from damaging the NMOS transistor FET2 and other components. The deterioration of the characteristic of the choke coil L1 itself can be prevented.

The present invention is not limited to the embodiments and various improvements and modifications can be made within the scope without departing from the purpose of the present invention. In the comparator COMP3 of the first embodiment, the output voltage is monitored to compare it with the reference voltage E2. Without being limited to this form, an electric current may be monitored. For instance, there may be provided a comparator such that the output of the amplifier AMP1 is connected to the inverting input terminal, the reference voltage E2 is connected to the non-inverting input terminal, and the output is inputted to the AND gate circuit AND2.

In the control parts 40, 40b and 40c in this embodiments, to stop the signal transmission of the reverse current detection signal BUD from the comparator COMP2 as a reverse current detection part to the NMOS transistor FET2, the method of masking the reverse current detection signal BUD is used. This form is not limited. For instance, in place of the masking method, a method of stopping the operation of the comparator COMP2 to fix the reverse current detection signal BUD to low level may be used.

The NMOS transistor FET1 is an example of the first switching device. The NMOS transistor FET2 is an example of the second switching device. The choke coil L1 is an example of the inductive device. The reference voltage E1 is an example of the first reference voltage setting part. The reference voltage E3 is an example of the second reference voltage setting part. The switch circuit SW2 is an example of the first switch circuit. The switch circuit SW3 is an example of the second switch circuit. The output reference voltage OE2 is an example of the reference load application voltage. The output voltage VOUT is an example of the load application voltage.

According to the present invention, it is possible to provide a control circuit of a DC—DC converter of a synchronous rectification system which can realize rapid lowering of an output voltage with low power consumption by rapidly lowering the output voltage while regenerating energy stored in the capacitance component on the load side to the input side, regardless of a heavy or light load, at the stop of power supply operation and a control method thereof.

What is claimed is:

1. A DC—DC converter control circuit which controls a first switching device brought into conduction when electric power is stored in an inductive device and a second switching device switching controlled and brought into conduction according to the period of the discharge of the electric power stored in the inductive device to a load, comprising:
    a reverse current detection part detecting an electric current in the reverse direction of the discharge of the electric power to the load to output a reverse current detection signal; and
    a control part which is a circuit bringing the second switching device to the non-conductive state according to the reverse current detection signal and neglects the reverse current detection signal according to a predetermined signal instructing lowering of a load application voltage applied to the load to bring the second switching device to the non-conductive state according to the load application voltage.

2. The DC—DC converter control circuit according to claim 1,
    wherein the predetermined signal is a power supply stop signal,
    wherein a detection part, detecting that the load application voltage is equal to or below a reference load application voltage, is provided, and
    wherein the control part brings the second switching device to the conductive state according to the power supply stop signal and brings the second switching device to the non-conductive state according to a detection signal of the detection part.

3. The DC—DC converter control circuit according to claim 2, wherein the regulating operation is stopped according to the power supply stop signal.

4. The DC—DC converter control circuit according to claim 2, wherein the control part masks the reverse current detection signal according to the power supply stop signal.

5. The DC—DC converter control circuit according to claim 2, wherein the reference load application voltage is an output voltage when substantially half of electric power stored on the load side is moved to the inductive device.

6. The DC—DC converter control circuit according to claim 2, wherein the reference load application voltage has a voltage value ($\frac{1}{2}$) times the load application voltage in the stationary state.

7. The DC—DC converter control circuit according to claim 1,
    wherein the predetermined signal is a power supply stop signal,
    wherein the DC—DC converter control circuit has:
    a reference voltage part in which a voltage is lowered with time according to the power supply stop signal; and
    an error amplifier having the voltage of the reference voltage part as a reference voltage.

8. The DC—DC converter control circuit according to claim 7,
    wherein the reference voltage part has:
    a capacitor; and
    a discharge part forming an electric charge discharge path according to the power supply stop signal.

9. The DC—DC converter control circuit according to claim 8, wherein the capacitor is a capacitor for soft-start.

10. The DC—DC converter control circuit according to claim 1,
    wherein the predetermined signal is a changing signal,
    wherein the DC—DC converter control circuit has:
    a reference voltage changing part in which a voltage is changed according to the changing signal; and
    an error amplifier having the voltage of the reference voltage changing part as a reference voltage.

11. The DC—DC converter control circuit according to claim 10, wherein the control part masks the reverse current detection signal according to the changing signal.

12. The DC—DC converter control circuit according to claim 10,
    wherein the reference voltage changing part has:
    an integrating circuit;
    a first reference voltage setting part connected via the integrating circuit to the error amplifier; and
    a second reference voltage setting part connected via the integrating circuit to the error amplifier,
    wherein the first reference voltage setting part or the second reference voltage setting part is selected according to the changing signal.

13. A DC—DC converter control method which controls a first current path brought into conduction when electric power is stored in an inductive device and a second current path brought into conduction according to the period of the discharge of the electric power stored in the inductive device to a load, comprising:
    detecting an electric current in the reverse direction of the discharge of the electric power to the load to output a reverse current detection signal;
    bringing the second switching device to the non-conductive state according to the reverse current detection signal; and
    neglecting the reverse current detection signal according to a predetermined signal instructing lowering of a load application voltage applied to the load to bring the second switching device to the non-conductive state according to the load application voltage.

14. The DC—DC converter control method according to claim 13,
    wherein the predetermined signal is a power supply stop signal,
    wherein the second switching device is brought to the conductive state according to the power supply stop signal, and
    wherein the second switching device is brought to the non-conductive state according to the detection that the load application voltage is equal to or below a reference load application voltage.

15. The DC—DC converter control method according to claim 13,
    wherein the predetermined signal is a power supply stop signal, and
    wherein a reference voltage of an error amplifier is lowered with time according to the power supply stop signal.

16. The DC—DC converter control method according to claim 13,
    wherein the predetermined signal is a changing signal, and
    wherein a reference voltage of an error amplifier is changed according to the changing signal.

* * * * *